United States Patent
Knight et al.

[11] Patent Number: 5,915,131
[45] Date of Patent: Jun. 22, 1999

[54] METHOD AND APPARATUS FOR HANDLING I/O REQUESTS UTILIZING SEPARATE PROGRAMMING INTERFACES TO ACCESS SEPARATE I/O SERVICES

[75] Inventors: Holly N. Knight, La Honda; Carl D. Sutton, Palo Alto; Wayne N. Meretsky, Los Altos; Alan B. Mimms, San Jose, all of Calif.

[73] Assignee: Apple Computer, Inc., Cupertino, Calif.

[21] Appl. No.: 08/435,677

[22] Filed: May 5, 1995

[51] Int. Cl.⁶ .............................. G06F 9/40; G06F 13/14
[52] U.S. Cl. ..................... 395/892; 395/682; 395/828; 395/702; 707/104; 345/333
[58] Field of Search ................... 395/828, 702, 395/834, 200.2, 892, 682, 309; 345/333; 707/104

[56] References Cited

U.S. PATENT DOCUMENTS

| | | | |
|---|---|---|---|
| 4,593,352 | 6/1986 | Castel et al. | 364/200 |
| 4,727,537 | 2/1988 | Nichols | 370/85 |
| 4,908,859 | 3/1990 | Bennett et al. | 380/10 |
| 4,982,325 | 1/1991 | Tignor et al. | 364/200 |
| 5,129,086 | 7/1992 | Coyle, Jr. et al. | 395/650 |
| 5,148,527 | 9/1992 | Basso et al. | 395/325 |
| 5,197,143 | 3/1993 | Lary et al. | 395/425 |
| 5,430,845 | 7/1995 | Rimmer et al. | 395/275 |
| 5,491,813 | 2/1996 | Bondy et al. | 395/500 |
| 5,513,365 | 4/1996 | Cook et al. | 395/800 |
| 5,535,416 | 7/1996 | Feeney et al. | 395/834 |
| 5,537,466 | 7/1996 | Taylor et al. | 379/201 |
| 5,553,245 | 9/1996 | Su et al. | 395/284 |
| 5,572,675 | 11/1996 | Bergler | 395/200.2 |

OTHER PUBLICATIONS

Forin, A., et al. entitled "An I/O System for Mach 3.0," Proceedings of the Usenix Mach Symposium 20–22, Nov. 1991, Monterey, CA, US, 20–22 Nov. 1991, pp. 163–176.

Steve Lemon and Kennan Rossi, entitled "An Object Oriented Device Driver Model," Digest of Papers Compcon '95, Technologies for the Information Superhighway 5–9, Mar. 1995, San Francisco, CA, USA pp. 360–366.

Glenn Andert, entitled "Object Frameworks in the Taligent OS," Intellectual Leverage: Digest of Papers of the Spring Computer SOCI International Conference (Compcon), San Francisco, Feb. 28–Mar. 4, 1994, Feb. 24, 1994, Institute of Electrical and Electronics Engineers, pp. 112–121.

Hu, 'Interconnecting electronic mail networks: Gateways and translation strategies are proposed for backbone networks to interchange incompatible electronic documents on multivendor networks', Data Communications, p. 128, vol. 17, No. 10, Sep. 1988.

Knibbe, 'IETF's Resource Reservation Protocol to facilitate mixed voice, data, and video nets', Network World, p. 51, Apr. 24, 1995.

*Primary Examiner*—Thomas C. Lee
*Assistant Examiner*—Rehana Perveen
*Attorney, Agent, or Firm*—Blakely, Sokoloff, Taylor & Zafman

[57] ABSTRACT

A computer system handling multiple applications wherein groups of I/O services are accessible through separate application programming interfaces. Each application has multiple application programming interfaces by which to access different families of I/O services, such as I/O devices.

20 Claims, 8 Drawing Sheets

METHOD AND APPARATUS FOR HANDLING I/O REQUESTS UTILIZING SEPARATE PROGRAMMING INTERFACES TO ACCESS SEPARATE I/O SERVICES

FIELD OF THE INVENTION

The invention relates to the field of computer systems; particularly, the present invention relates to handling service requests generated by application programs.

BACKGROUND OF THE INVENTION

Application programs running in computer systems often access system resources, such as input/output (I/O) devices. These system resources are often referred to as services. Certain sets of services (e.g., devices) have similar characteristics. For instance, all display devices or all ADB devices have similar interface requirements.

To gain access to I/O resources, applications generate service requests to which are sent through an application programming interface (API). The service requests are converted by the API to a common set of functions that are forwarded to the operating system to be serviced. The operating system then sees that service requests are responded to by the appropriate resources (e.g., device). For instance, the operating system may direct a request to a device driver.

One problem in the prior art is that service requests are not sent directly to the I/O device or resource. All service requests from all applications are typically sent through the same API. Because of this, all of the requests are converted into a common set of functions. These common set of functions do not have meaning for all the various types of I/O devices. For instance, a high level request to play a sound may be converted into a write function to a sound device. However, the write function is not the best method of communicating sound data to the sound device. Thus, another conversion of write data to a sound data format may be required. Also, some functions do not have a one-to-one correspondence with the function set of some I/O devices. Thus, it would be desirable to avoid this added complexity and to take advantage of the similar characteristics of classes of I/O devices when handling I/O requests, while providing services and an environment in which to run those services that is tuned to the specific device needs and requirements.

SUMMARY OF THE INVENTION

A method and apparatus for handling I/O requests is described. In the present invention, the I/O requests are handled by the computer system having a bus and a memory coupled to the bus that stores data and programming instructions. The programming instructions include application programs and an operating system. A processing unit is coupled to the bus and runs the operating system and application programs by executing programming instructions. Each application programs have multiple separate programming interfaces available to access multiple sets of I/O services provided through the operating system via service requests.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
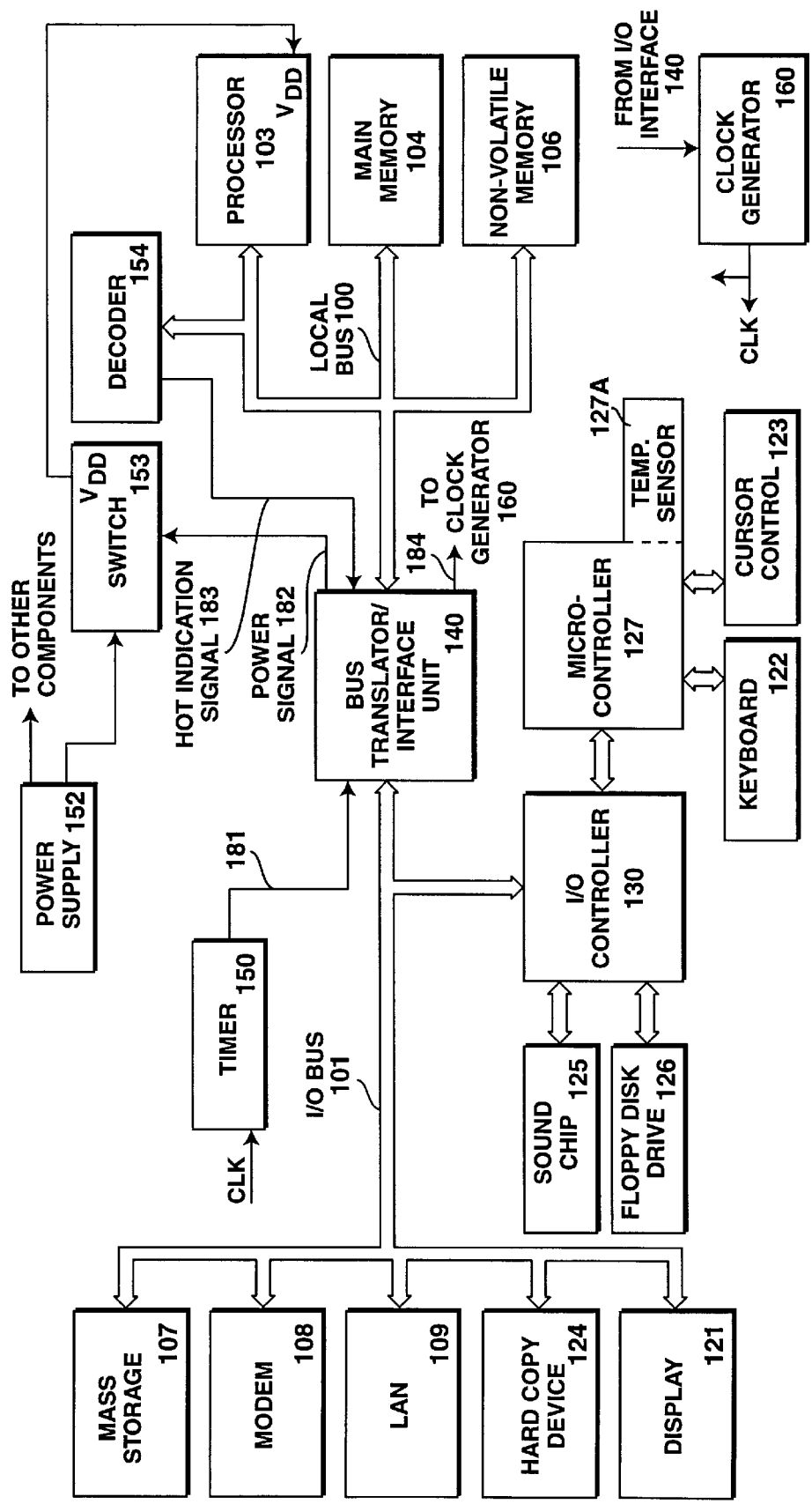
FIG. 1 a block diagram of one embodiment in the computer system of the present invention.

A method and apparatus handling service requests is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Computer System of the Present Invention

Referring to FIG. 1, an overview of a computer system of the present invention is shown in block diagram form. The present invention may be implemented on a general purpose microcomputer, such as one of the members of the Apple family of personal computers, one of the members of the IBM personal computer family, or one of several other computer devices which are presently commercially available. Of course, the present invention may also be implemented on a multi-user system while encountering all of the costs, speed, and function advantages and disadvantages available with these machines.

As illustrated in FIG. 1, the computer system of the present invention generally comprises a local bus or other communication means 100 for communicating information, a processor 103 coupled with local bus 100 for processing information, a random access memory (RAM) or other dynamic storage device 104 (commonly referred to as a main memory) coupled with local bus 100 for storing information and instructions for processor 103, and a read-only memory (ROM) or other non-volatile storage device 106 coupled with local bus 100 for storing non-volatile information and instructions for processor 103.

The computer system of the present invention also includes an input/output (I/O) bus or other communication means 101 for communication information in the computer system. A data storage device 107, such as a magnetic tape and disk drive, including its associated controller circuitry, is coupled to I/O bus 101 for storing information and instructions. A display device 121, such as a cathode ray tube, liquid crystal display, etc., including its associated controller circuitry, is also coupled to I/O bus 101 for displaying information to the computer user, as well as a hard copy device 124, such as a plotter or printer, including its associated controller circuitry for providing a visual representation of the computer images. Hard copy device 124 is coupled with processor 103, main memory 104, non-volatile memory 106 and mass storage device 107 through I/O bus 101 and bus translator/interface unit 140. A modem 108 and an ethernet local area network 109 are also coupled to I/O bus 101.

Bus interface unit 140 is coupled to local bus 100 and I/O bus 101 and acts as a gateway between processor 103 and the I/O subsystem. Bus interface unit 140 may also provide translation between signals being sent from units on one of the buses to units on the other bus to allow local bus 100 and I/O bus 101 to co-operate as a single bus.

An I/O controller 130 is coupled to I/O bus 101 and controls access to certain I/O peripherals in the computer system. For instance, I/O controller 130 is coupled to controller device 127 that controls access to an alpha-numeric input device 122 including alpha-numeric and other keys, etc., for communicating information and command selections to processor 103, and a cursor control 123, such as a trackball, stylus, mouse, or trackpad, etc., for controlling cursor movement. The system also includes a sound chip 125 coupled to I/O controller 130 for providing audio recording and play back. Sound chip 125 may include a sound circuit and its driver which are used to generate various audio signals from the computer system. I/O controller 130 may also provide access to a floppy disk and driver 126. The processor 103 controls I/O controller 130 with its peripherals by sending commands to I/O controller 130 via local bus 100, interface unit 140 and I/O bus 101.

Batteries or other power supply 152 may also be included to provide power necessary to run the various peripherals and integrated circuits in the computer system. Power supply 152 is typically a DC power source that provides a constant DC power to various units, particularly processor 103. Various units such as processor 103, display 121, etc., also receive clocking signals to synchronize operations within the computer systems. These clocking signals may be provided by a global clock generator or multiple clock generators, each dedicated to a portion of the computer system. Such a clock generator is shown as clock generator 160. In one embodiment, clock generator 160 comprise a phase-locked loop (PLL) that provides clocking signals to processor 103.

I/O controller 140 includes control logic to coordinate the thermal management. Several additional devices are included within the computer system to operate with the control logic within I/O controller 140. A timer 150, a switch 153 and a decoder 154 are included to function in connection with the control logic. In one embodiment, decoder 154 is included within bus interface unit 140 and timer 150 is included in I/O controller 130.

Switch 153 is a p-channel power MOSFET, which has its gate connected to the power signal 182, its source to the power supply and its drain to processor's $V_{DD}$ pin.

In one embodiment, processor 103 is a member of the PowerPC™ family of processors, such as those manufactured by Motorola Corporation of Schaumberg, Ill. The memory in the computer system is initialized to store the operating system as well as other programs, such as file directory routines and application programs, and data inputted from I/O controller 130. In one embodiment, the operating system is stored in ROM 106, while RAM 104 is utilized as the internal memory for the computer system for accessing data and application programs. Processor 103 accesses memory in the computer system via an address bus within bus 100. Commands in connection with the operation of memory in the computer system are also sent from the processor to the memory using bus 100. Bus 100 also includes a bi-directional data bus to communicate data in response to the commands provided by processor 103 under the control of the operating system running on it.

Of course, certain implementations and uses of the present invention may neither require nor include all of the above components. For example, in certain implementations a keyboard or cursor control device for inputting information to the system may not be required. In other implementations, it may not be required to provide a display device displaying information. Furthermore, the computer system may include additional processing units.

The operating system running on processor 103 takes care of basic tasks such as starting the system, handling interrupts, moving data to and from memory 104 and peripheral devices via input/output interface unit 140, and managing the memory space in memory 104. In order to take care of such operations, the operating system provides multiple execution environments at different levels (e.g., task level, interrupt level, etc.). Tasks and execution environments are known in the art.

Overview of the Present Invention

In one embodiment, the computer system runs a kernel-based, preemptive, multitasking operation system in which applications and I/O services, such as drivers, operate in separate protection domains (e.g., the user and kernel domains, respectively). The user domain does not have direct access to data of the kernel domain, while the kernel domain can access data in the user domain.

The computer system of the present invention uses one or more separate families to provide I/O services to the system. Each I/O family provides a set of I/O services to the system. For instance, a SCSI family and its SCSI interface modules (SIMs) provide SCSI based services, while a file systems family and its installable file systems provide file management services. In one embodiment, an I/O family is implemented by multiple modules and software routines.

Each family defines a family programming interface (FPI) designed to meet the particular needs of that family. An FPI provides access to a given family's plug-ins, which are dynamically loaded pieces of software that each provide an instance of the service provided by a family. For example, within the file systems family (File Manager), a plug-in implements file-system-specific services. In one embodiment, plug-ins are a superset of device drivers, such that all drivers are plug-ins, but not all plug-ins are drivers.

Access to services is available only through an I/O family's programming interface. In one embodiment, hardware is not directly accessible to application software, nor is it vulnerable to application error. Applications have access to hardware services only through an I/O family's programming interface. Also, the context within which an I/O service runs and the method by which it interacts with the system is defined by the I/O family to which it belongs.

Figure 2:
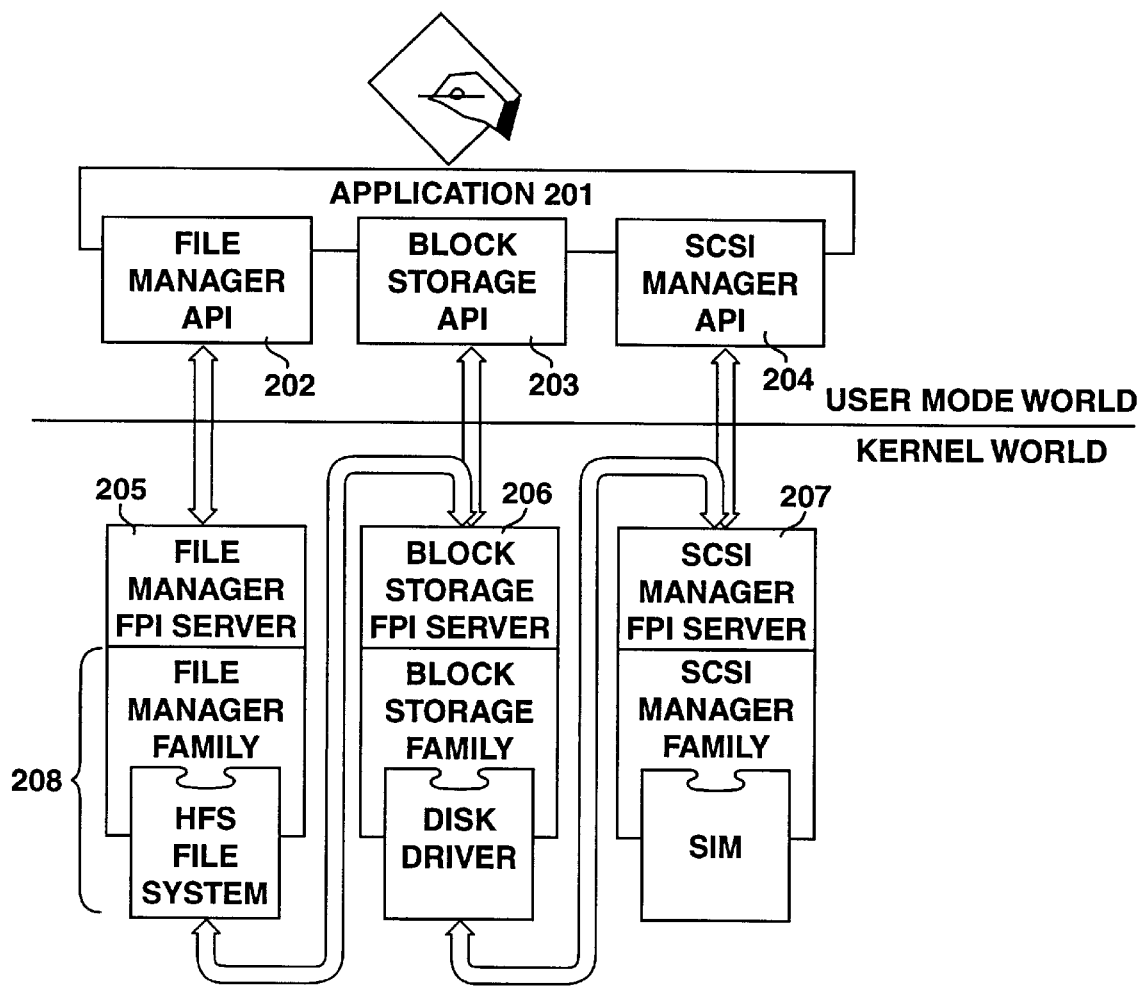
FIG. 2 is an overview of the I/O architecture of the present invention.

FIG. 2 illustrates the relationship between an application, several I/O families, and their plug-ins. Referring to FIG. 2, an application 201 requests services through one or more family FPIs, shown in FIG. 2 as File Manager API 202, Block Storage API 203, and SCSI Manager API 204. The File Manager API 202, Block Storage API 203, and SCSI Manager API 204 are available to one or more applications in the user domain.

In one embodiment, the service requests from application 201 (and other applications) are sent through File Manager API 202, Block Storage API 203, and/or SCSI Manager API 204, etc., and flow as messages to family FPI servers 205–207, which reside in the kernel domain. In one embodiment, the messages are delivered using a kernel-supplied messaging service.

Any communication method may be used to communicate service requests to I/O families. In one embodiment, kernel messaging is used between the FPI libraries and the FPI server for a given family, between different families, and between plug-ins of one family and another family. The communication method used should be completely opaque to a client requesting a family service.

Each of the FPI servers 205–207 permit access to a distinct set of services. For example, File Manager FPI server 205 handles service for the file manager family of services. Similarly, the Block Storage FPI server 206 handles service requests for the block storage family of services.

Note that FIG. 2 shows three families linked by kernel messages. Messages flow from application level through a family to another family, and so on. For instance, a service request may be communicated from application level to the file system family, resulting in one or more requests to the block storage family, and finally one or more to the SCSI family to complete a service request. Note that in one embodiment, there is no hierarchical relationship among families; all families are peers of each other.

Families in the Present Invention

A family provides a distinct set of services to the system. For example, one family may provide network services, while another provides access to a variety of block storage mediums. A family is associated with a set of devices that have similar characteristics, such as all display devices or all ADB devices.

In one embodiment, each family is implemented in software that runs in the computer system with applications. A family comprises software that includes a family programming interface and its associated FPI library or libraries for its clients, an FPI server, an activation model, a family expert, a plug-in programming interface for its plug-ins, and a family services library for its plug-ins.

Figure 3:
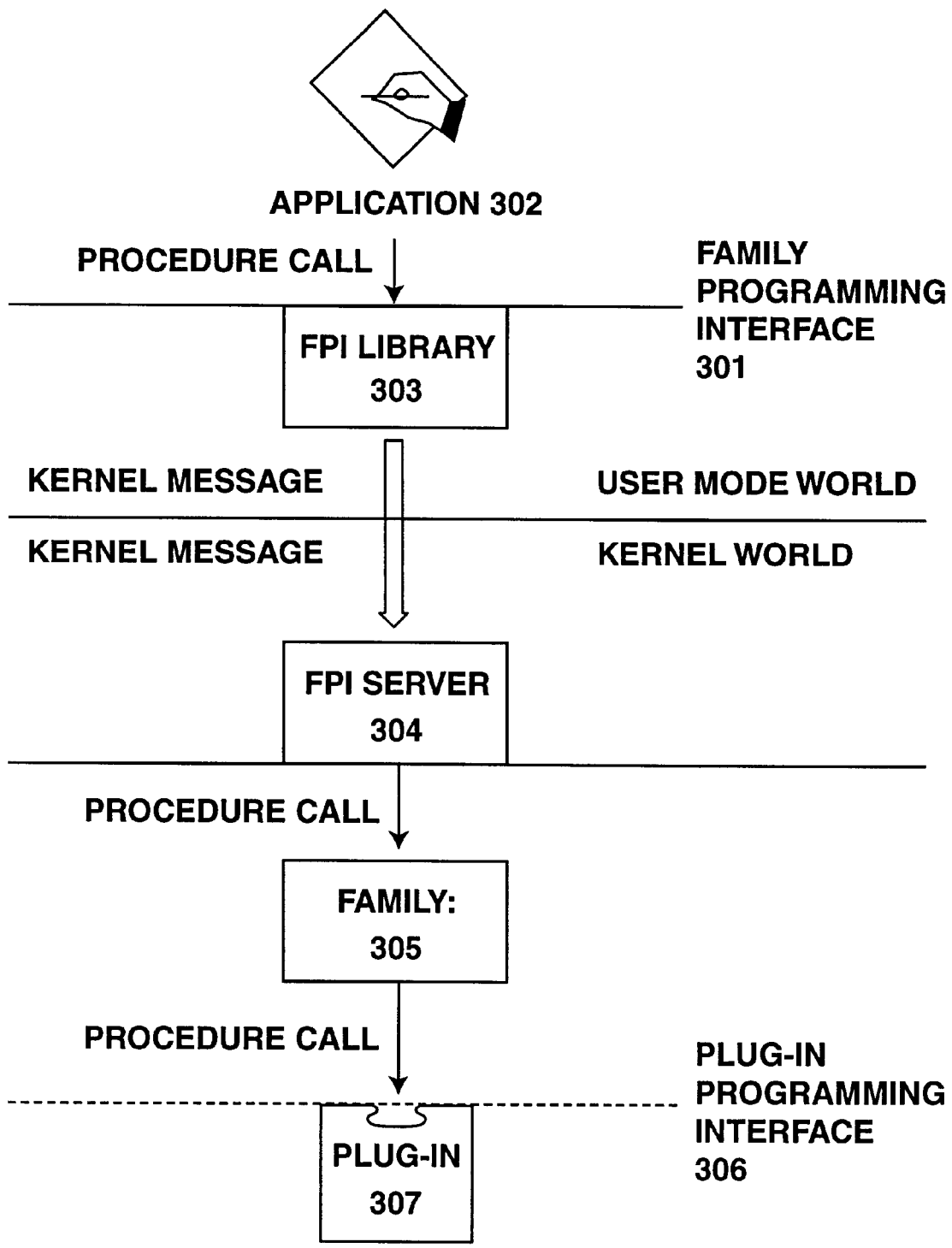
FIG. 3 illustrates a flow diagram of I/O service request handling according to the teachings of the present invention.

FIG. 3 illustrates the interaction between these components. Referring to FIG. 3, a family programming interface (FPI) 301 provides access to the family's services to one or more applications, such as application 302. The FPI 301 also provides access to plug-ins from other families and to system software. That is, an FPI is designed to provide callers with services appropriate to a particular family, whether those calls originate from in the user domain or the operating system domain.

For example, when an application generates data for a video device, a display FPI tailored to the needs of video devices is used to gain access to display services. Likewise, when an application desires to input or output sound data, the application gains access to a sound family of services through an FPI. Therefore, the present invention provides family programming interfaces tailored to the needs of specific device families.

Service requests from application 302 (or other applications) are made through an FPI library 303. In one embodiment, the FPI library 303 contains code that passes requests for service to the family FPI server 304. In one embodiment, the FPI library 303 maps FPI function calls into messages (e.g., kernel messages) and sends them to the FPI server 304 of the family for servicing. In one embodiment, a family 305 may provide two versions of its FPI library 303, one that runs in the user domain and one that runs in the operating system kernel domain.

In one embodiment, FPI server 304 runs in the kernel domain and responds to service requests from family clients (e.g., applications, other families, etc.). FPI server 304 responds to a request according to the activation model (not shown) of the family 305. In one embodiment, the activation model comprises code that provides the runtime environment of the family and its plug-ins. For instance, FPI server 304 may put a request in a queue or may call a plug-in directly to service the request. As shown, the FPI server 304 forwards a request to the family 305 using a procedure call. Note that if FPI library 303 and the FPI server 304 use kernel messaging to communicate, the FPI server 304 provides a message port.

Each family 305 includes an expert (not shown) to maintain knowledge of the set of family devices. In one embodiment, the expert comprises code within a family 305 that maintains knowledge of the set of family plug-ins within the system. At system startup and each time a change occurs, the expert is notified.

In one embodiment, the expert may maintain the set of family services using a central device registry in the system.

The expert scans the device registry for plug-ins that belong to its family. For example, a display family expert looks for display device entries. When a family expert finds an entry for a family plug-in, it instantiates the plug-in, making it available to clients of the family. In one embodiment, the system notifies the family expert on an ongoing basis about new and deleted plug-ins in the device registry. As a result, the set of plug-ins known to and available through the family remains current with changes in system configuration.

Note that family experts do not add or alter information in the device registry nor do they scan hardware. In one embodiment, the present invention includes another level of families (i.e., low-level families) whose responsibility is to discover devices by scanning hardware and installing and removing information for the device registry. These low-level families are the same as the families previously discussed above (i.e., high level family) in other ways, i.e. they have experts, services, an FPI, a library, an activation model and plug-ins. The low-level families' clients are usually other families rather than applications. In one embodiment, families are insulated from knowledge of physical connectivity. Experts and the device registry are discussed in more detail below.

A plug-in programming interface (PPI) 306 provides a family-to-plug-in interface that defines the entry points a plug-in supports so that it can be called and a plug-in-to-family interface that defines the routines plug-ins call when certain events, such as an I/O completion, occur. In addition, PPI 306 defines the path through which the family and its plug-in exchange data.

A family services library (not shown) is a collection of routines that provide services to the plug-ins of a family. The services are specific to a given family and they may be layered on top of services provided by the kernel. Within a family, the methods by which data is communicated, memory is allocated, interrupts are registered and timing services are provided may be implemented in the family services library. Family services libraries may also maintain state information needed by a family to dispatch and manage requests.

For example, a display family services library provides routines that deal with vertical blanking (which is a concern of display devices). Likewise, SCSI device drivers manipulate command blocks, so the SCSI family services library contains routines that allow block manipulation. A family services library that provides commonly needed routines simplifies the development of that family's plug-ins.

Through the PPI 306, a call is made to a plug-in 307. In one embodiment, a plug-in, such as plug-in 307, comprises dynamically loaded code that runs in the kernel's address space to provide an instance of the service provided by a family. For example, within the file systems family, a plug-in implements file-system-specific services. The plug-ins understand how data is formatted in a particular file system such as HFS or DOS-FAT. On the other hand, it is not the responsibility of file systems family plug-ins to obtain data from a physical device. In order to obtain data from a physical device, a file system family plug-in communicates to, for instance, a block storage family. In one embodiment, block storage plug-ins provide both media-specific drivers, such as a tape driver, a CD-ROM driver, or hard disk driver, and volume plug-ins that represent partitions on a given physical disk. Block storage plug-ins in turn may make SCSI family API calls to access data across the SCSI bus on a physical disk. Note that in the present invention, plug-ins are a superset of device drivers. For instance, plug-ins may include code that does not use hardware. For instance, file system and block storage plug-ins are not drivers (in that drivers back hardware).

Applications, plug-ins from other I/O families, and other system software can request the services provided by a family's plug-ins through the family's FPI. Note also that plug-ins are designed to operate in the environment set forth by their family activation model.

In one embodiment, a plug-in may comprises two code sections, a main code section that runs in a task in the kernel domain and an interrupt level code section that services hardware interrupts if the plug-in is, for instance, a device driver. In one embodiment, only work that cannot be done at task level in the main code section should be done at interrupt level. In one embodiment, all plug-ins have a main code section, but not all have interrupt level code sections.

The main code section executes and responds to client service requests made through the FPI. For example, sound family plug-ins respond to sound family specific requests such as sound playback mode setting (stereo, mono, sample size and rate), sound play requests, sound play cancellation, etc. The interrupt level code section executes and responds to interrupts from a physical device. In one embodiment, the interrupt level code section performs only essential functions, deferring all other work to a higher execution levels.

Also because all of the services associated with a particular family are tuned to the same needs and requirements, the drivers or plug-ins for a given family may be as simple as possible.

Family Programming Interfaces

Figure 4:
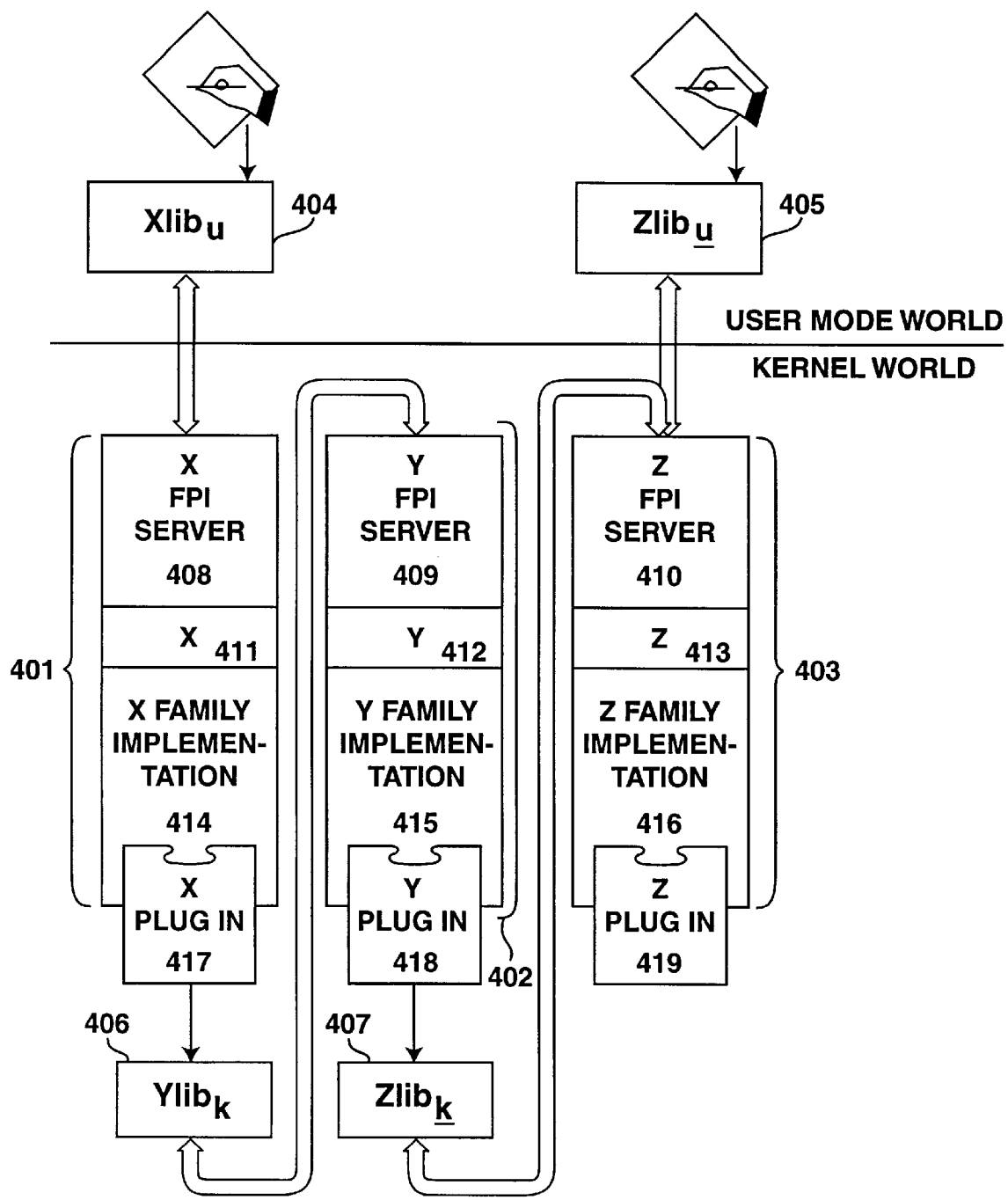
FIG. 4 illustrates an overview of the I/O architecture of the present invention having selected families accessing other families.

In the present invention, a family provides either a user-mode or a kernel-mode FPI library, or both, to support the family's FPI. FIG. 4 illustrates one embodiment of the I/O architecture of the present invention. Referring to FIG. 4, three instances of families 401–403 are shown operating in the kernel environment. Although three families are shown, the present invention may have any number of families.

In the user mode, two user-mode FPI libraries, $Xlib_u$ 404 and $Zlib_u$ 405, are shown that support the FPIs for families X and Z, respectively. In the kernel environment, two kernel-mode FPI libraries, $Ylib_k$ 406 and $Zlib_k$ 407, for families Y and Z, respectively, are shown.

Both the user-mode and the kernel-mode FPI libraries present the same FPI to clients. In other words, a single FPI is the only way family services can be accessed. In one embodiment, the user-mode and kernel mode libraries are not the same. This may occur when certain operations have meaning in one mode and not the other. For example, operations that are implemented in the user-mode library, such as copying data across address-space boundaries, may be unnecessary in the kernel library.

In response to service requests, FPI libraries 404 and 405 map FPI functions into messages for communication from the user mode to the kernel mode. In one embodiment, the messages are kernel messages.

The service requests from other families are generated by plug-ins that make calls on libraries, such as FPI libraries 406 and 407. In one embodiment, FPI libraries 406 and 407 map FPI functions into kernel messages and communicate those messages to FPI servers such as Y FPI server 409 and Z FPI server 410 respectively. Other embodiments may use mechanisms other than kernel messaging to communicate information.

In the example, the Z family 403 has both a user-mode library 405 and a kernel-mode library 407. Therefore, the services of the Z family may be accessed from both the user mode and the kernel mode.

In response to service request messages, X FPI server 408, Y FPI server 409 and Z FPI server 410 dispatch requests for services to their families. In one embodiment, each of FPI servers 408–410 receives a kernel message, maps the message into a FPI function called by the client, and then calls the function in the family implementation (414–416).

In one embodiment, there is a one-to-one correspondence between the FPI functions called by clients and the function called by FPI servers 408–410 as a result. The calls from FPI serves 408–410 are transferred via interfaces 411–413. For instance, X interface 411 represents the interface presented to the FPI server 408 by the X family 414. It is exactly the same as the FPI available to applications or other system software. The same is true of Y interface 412 and Z interface 413.

The X family implementation 414 represents the family activation model that defines how requests communicated from server 408 are serviced by the family and plug-in(s). In one embodiment, X family implementation 414 comprises family code interfacing to plug-in code that completes the service requests from application 400 via server 408. Similarly, the Y family implementation 415 and Z family implementation 416 define their family's plug-in activation models.

X plug-in 417, Y plug-in 418 and Z plug-in 419 operate within the activation model mandated by the family and provide code and data exports. The required code and data exports and the activation model for each family of drivers is family specific and different.

Extending Family Programming Interfaces

A plug-in may provide a plug-in-specific interface that extends its functionality beyond that provided by its family. This is useful in a number of situations. For example, a block storage plug-in for a CD-ROM device may provide a block storage plug-in interface required of the CD-ROM device as well as an interface that allows knowledgeable application software to control audio volume and to play, pause, stop, and so forth. Such added capabilities require a plug-in-specific API.

Figure 5:
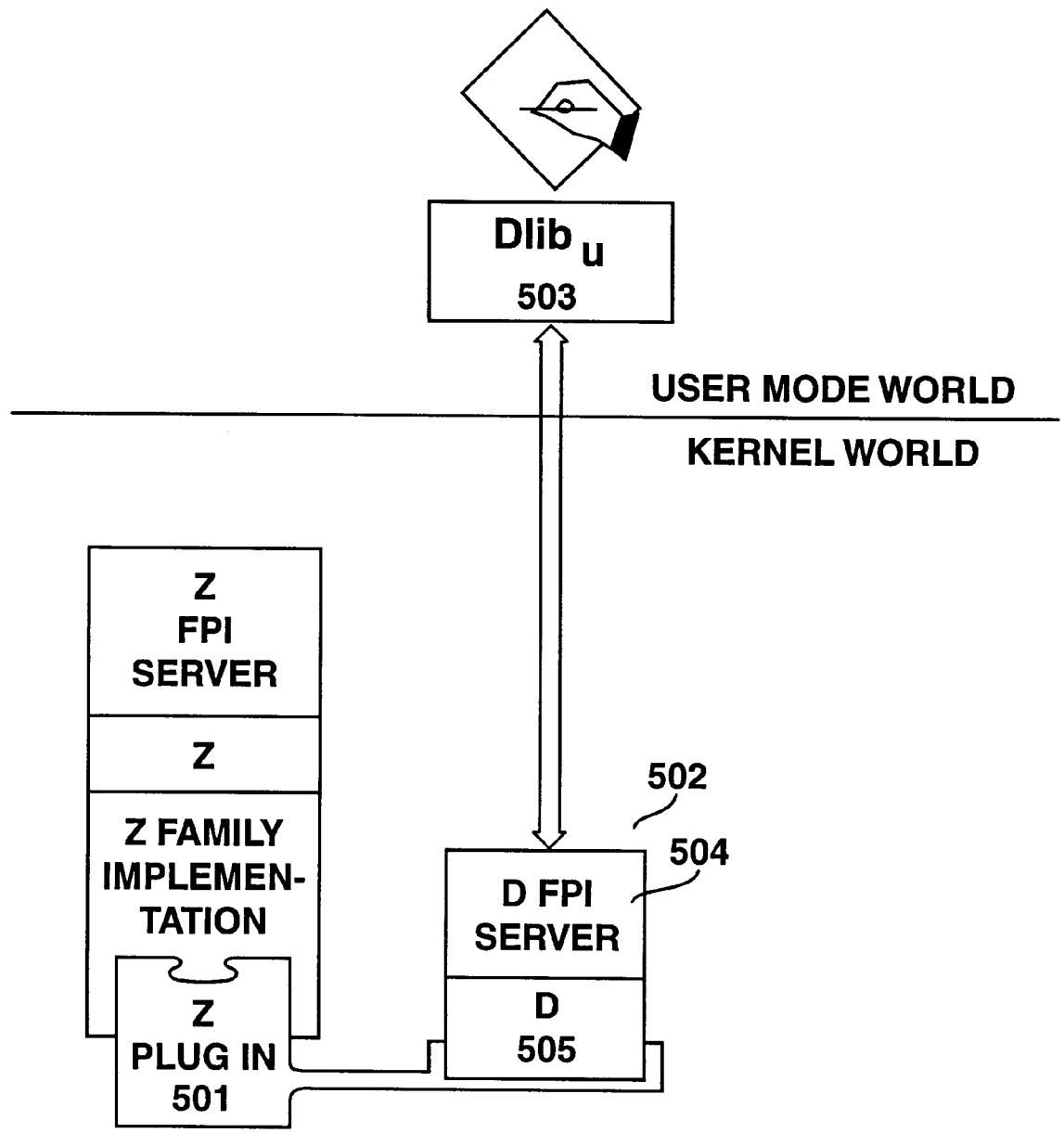
FIG. 5 illustrates extended programming family interface of the present invention.

If a device wishes to export extended functionality outside the family framework, a separate message port is provided by the device and an interface library for that portion of the device driver. FIG. 5 illustrates the extension of a family programming interface.

Referring to FIG. 5, a plug-in module, Z plug-in 501, extends beyond the Z family boundary to interface to family implementation D 502 as well. A plug-in that has an extended API offers features in addition to those available to clients through it's family's FPI. In order to provide extra services, the plug-in provides additional software shown in FIG. 5 as an interface library $Dlib_u$ 503, the message port code D FPI server 504, and the code that implements the extra features D 505.

Sharing Code and Data Between Plug-ins

Figure 6:
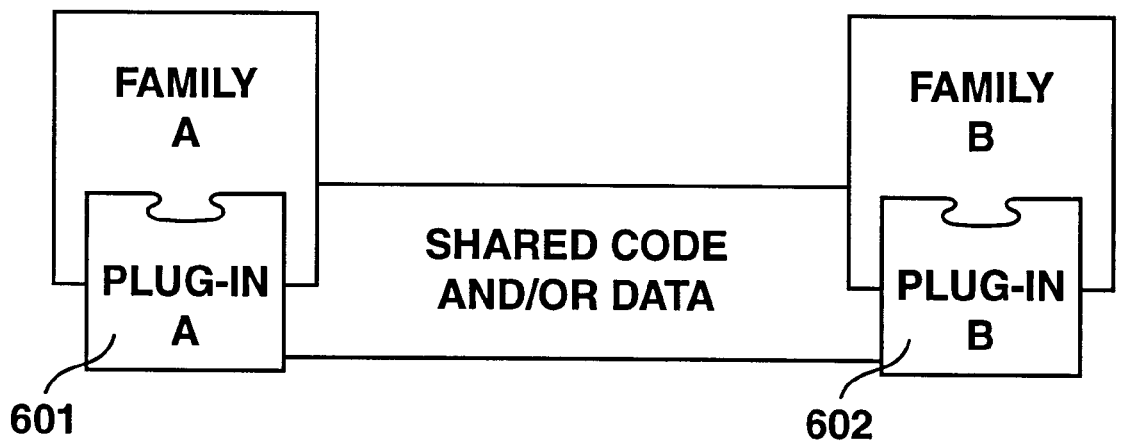
FIG. 6 illustrates plug-in modules of different families that share code and/or data.

In one embodiment, two or more plug-ins can share data or code or both, regardless of whether the plug-ins belong to the same family or to different families. Sharing code or data is desirable when a single device is controlled by two or more families. Such a device needs a plug-in for each family. These plug-ins can share libraries that contain information about the device state and common code. FIG. 6 illustrates two plug-ins that belong to separate families and that share code and data.

Plug-ins can share code and data through shared libraries. Using shared libraries for plug-ins that share code or data allows the plug-ins to be instantiated independently without encountering problems related to simultaneous instantiation. Referring to FIG. 6, the first plug-in 601 to be opened and initialized obtains access to the shared libraries. At this point, the first plug-in 601 does not share access. When the second plug-in 602 is opened and initialized, a new connection to the shared libraries is created. From that point, the two plug-ins contend with each other for access to the shared libraries.

Sharing code or data may also be desirable in certain special cases. For instance, two or more separate device drivers may share data as a way to arbitrate access to a shared device. An example of this is a single device that provides network capabilities and real time clock. Each of these functions belong to a distinct family but may originate in a single physical device.

Activation Models in the Present Invention

An activation model defines how the family is implemented and the environment within which plug-ins of the family execute. In one embodiment, the activation model of the family defines the tasking model a family uses, the opportunities the family plug-ins have to execute and the context of those opportunities (for instance, are the plug-ins called at task time, during privileged mode interrupt handling, and so forth), the knowledge about states and processes that a family and its plug-ins are expected to have, and the portion of the service requested by the client that is performed by the family and the portion that is performed by the plug-ins.

Each model provides a distinctly different environment for the plug-ins to the family, and different implementation options for the family software. Examples of activation models include the single-task model, the task-per-plug-in model, and the task-per-request model. Each is described in further detail below. Note that although three activation models are discussed, the choice of activation model is a design choice and different models may be used based on the needs and requirements of the family.

In one embodiment, the activation model uses kernel messaging as the interface between the FPI libraries that family clients link to and the FPI servers in order to provide the asynchronous or synchronous behavior desired by the family client. Within the activation model, asynchronous I/O requests are provided with a task context. In all cases, the implementation of the FPI server depends on the family activation model.

The choice of activation model limits the plug-in implementation choices. For example, the activation model defines the interaction between a driver's hardware interrupt level and the family environment in which the main driver runs. Therefore, plug-ins conform to the activation model employed by its family.

Single-Task Model

One of the activation models that may be employed by a family is referred to herein as the single-task activation model. In the single-task activation model, the family runs as a single monolithic task which is fed from a request queue and from interrupts delivered by plug-ins. Requests are delivered from the FPI library to an accept function that enqueues the request for processing by the family's processing task and wakes the task if it is sleeping. Queuing, synchronization, and communication mechanism within the family follow a set of rules specified by the family.

Figure 7:
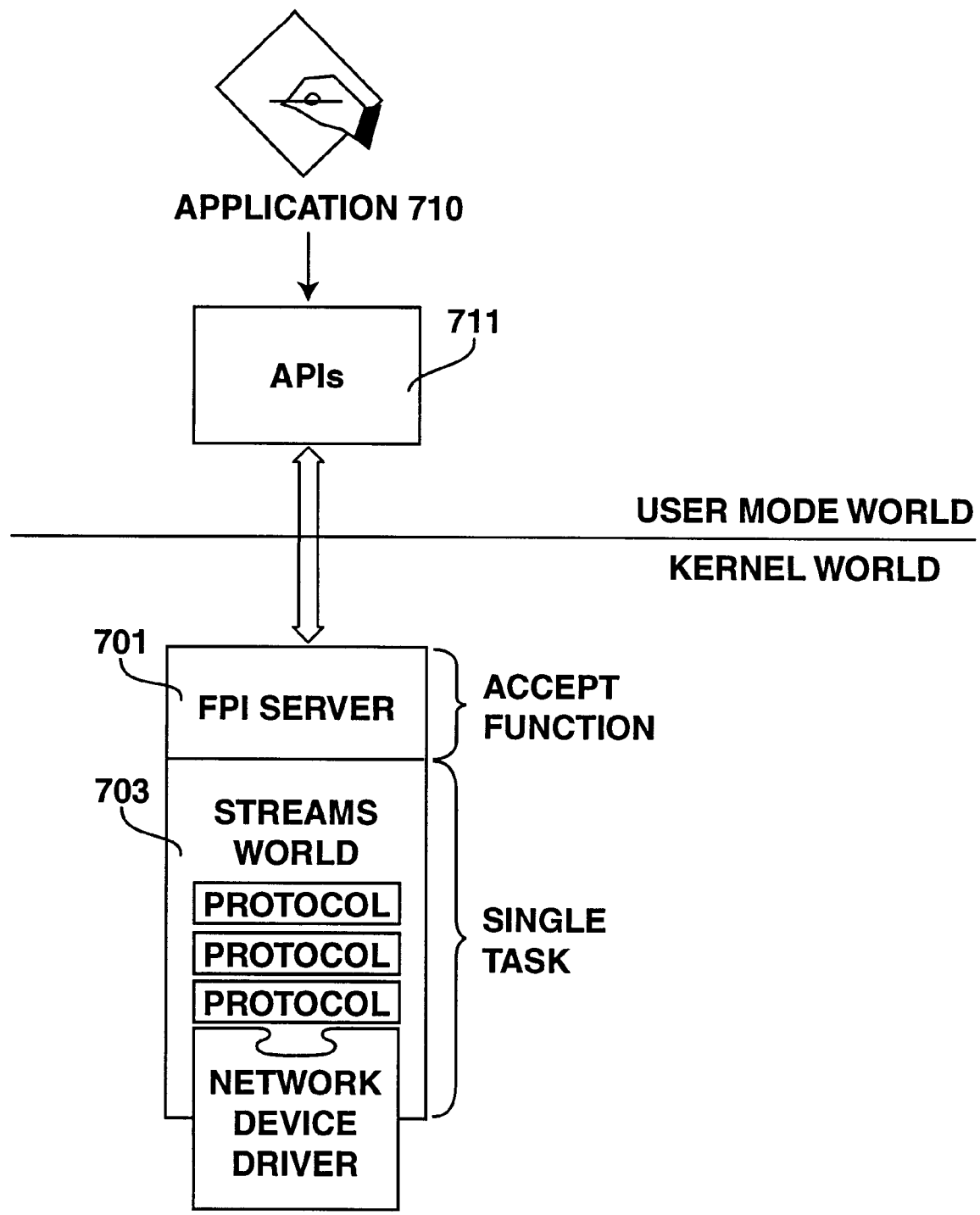
FIG. 7 illustrates a single task activation model according to the teachings of the present invention.

The interface between the FPI Server and a family implementation using the single-task model is asynchronous. Regardless of whether the family client called a function synchronously or asynchronously, the FPI server calls the family code asynchronously. The FPI server maintains a set of kernel message IDs that correspond to messages to which the FPI server has not yet replied. The concept of maintaining kernel message IDs corresponding to pending I/O server request messages is well-known in the art;

Consider as an example family 700, which uses the single-task activation model, shown in FIG. 7. Referring to FIG. 7, an application 710 is shown generating a service request to the family's APIs 711. APIs 711 contain at least one library in which service requests are mapped to FP1 functions. The FPI functions are forwarded to the family's FPI server 701. FPI server 701 dispatches the FPI function to family implementation 703, which includes various protocols and a network device driver that operate as a single task. Each protocol layer provides a different level of service.

The FPI server 701 is an accept function that executes in response to the calling client via the FPI library (not shown). An accept function, unlike a message-receive-based kernel task, is able to access data within the user and kernel bands directly. The accept function messaging model requires that FPI server 701 be re-entrant because the calling client task may be preempted by another client task making service requests.

When an I/O request completes within the family's environment, a completion notification is sent back to the FPI server 701, which converts the completion notification into the appropriate kernel message ID reply. The kernel message ID reply is then forwarded to the application that generated the service request.

With a single-task model, the family implementation is insulated from the kernel in that the implementation does it not have kernel structures, IDs, or tasking knowledge. On the other hand, the relationship between FPI server 701 and family code 702 is asynchronous, and has internal knowledge of data structures and communication mechanisms of the family.

The single-task model may be advantageously employed for families of devices that have one of several characteristics: (1) each I/O request requires little effort of the processing unit. This applies not only to keyboard or mouse devices but also to DMA devices to the extent that the processing unit need only set up the transfer, (2) no more than one I/O request is handled at once, such that, for instance, the family does not allow interleaving of I/O requests. This might apply to sound, for example, or to any device for which exclusive reservation is required (i.e., where only one client can use a device at a time). The opposite of a shared resource. Little effort for the processor exists where the processor initiates an I/O request and then is not involved until the request completes, or (3) the family to be implemented provides its own scheduling mechanisms independent of the underlying kernel scheduling. This applies to the Unix™ stream programming model.

Task-Per-Plug-In Model

For each plug-in instantiated by the family, the family creates a task that provides the context within which the plug-in operates.

Figure 8:
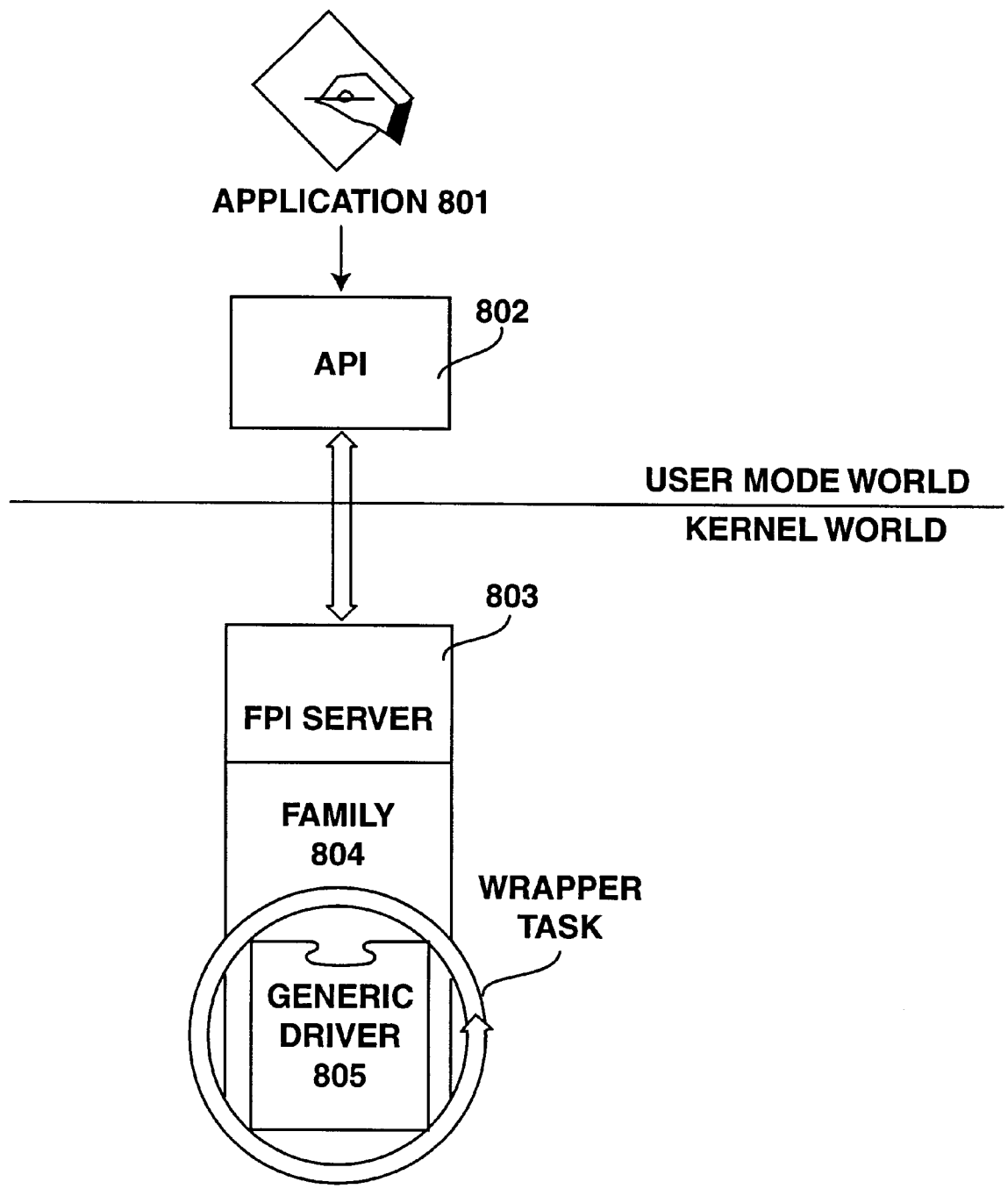
FIG. 8 illustrates a task-per-plug-in model used as an activation model according to the teachings of the present invention.

FIG. 8 illustrates the task-per-plug-in model. Referring to FIG. 8, an application 801 generates service requests for the family, which are sent to FPI 802. Using an FPI library, the FPI 802 generates a kernel message according to the family activation model 804 and a driver, such as plug-in driver 805.

In one embodiment, the FPI server 803 is a simple task-based message-receive loop or an accept function. FPI server 803 receives requests from calling clients and passes those requests to the family code 804. The FPI server 803 is responsible for making the data associated with a request available to the family, which in turn makes it available to the plug-in that services the request. In some instances, this responsibility includes copying or mapping buffers associated with the original request message to move the data from user address space to the kernel level area.

The family code 804 consists in part of one or more tasks, one for each family plug-in. The tasks act as a wrapper for the family plug-ins such that all tasking knowledge is located in the family code. A wrapper is a piece of code that insulates called code from the original calling code. The wrapper provides services to the called code that the called code is not aware of.

When a plug-in's task receives a service request (by whatever mechanisms the family implementation uses), the task calls its plug-in's entry points, waits for the plug-in's response, and then responds to the service request.

The plug-in performs the work to actually service the request. Each plug-in does not need to know about the tasking model used by the family or how to respond to event queues and other family mechanisms; it only needs to know how to perform its particular function.

For concurrent drivers, all queuing and state information describing an I/O request is contained within the plug-in code and data and within any queued requests. The FPI library forwards all requests regardless of the status of outstanding I/O requests to the plug-in. When the client makes a synchronous service request, the FPI library sends a synchronous kernel message. This blocks the requesting client, but the plug-in's task continues to run within its own task context. This permits clients to make requests of this plug-in even while another client's synchronous request is being processed.

In some cases of a family, a driver (e.g., 805) can be either concurrent or nonconcurrent. Nevertheless, clients of the family may make synchronous and asynchronous requests, even though the nonconcurrent drivers can handle only one request at a time. The device manager FPI server 803 knows that concurrent drivers cannot handle multiple requests concurrently. Therefore, FPI server 803 provides a mechanism to queue client requests and makes no subsequent requests to a task until the task signals completion of an earlier I/O request.

When a client calls a family function asynchronously, the FPI library sends an asynchronous kernel message to the FPI server and returns to the caller. When a client calls a family function synchronously, the FPI library sends a synchronous kernel message to the FPI server and does not return to the caller until the FPI server replies to the message, thus blocking the caller's execution until the I/O request is complete.

In either case, the behaviors of the device manager FPI server 803 is exactly the same: for all incoming requests, it either queues the request or passes it to the family task, depending on whether the target plug-in is busy. When the plug-in signals that the I/O operation is complete, the FPI server 803 replies to the kernel message. When the FPI library receives the reply, it either returns to the synchronous client, unblocking its execution or it notifies the asynchronous client about the I/O completion.

The task-per-plug-in model is intermediate between the single-task and task-per-request models in terms of the number of tasks it typically uses. The task-per-plug-in model is advantageously used where the processing of I/O requests varies widely among the plug-ins.

Task-Per-Request Model

The task-per-request model shares the following characteristics with the two activation models already discussed:

(1) the FPI library to FPI server communication provides the synchronous or asynchronous calling behavior requested by family clients, and (2) the FPI library and FPI server use kernel messages to communicate I/O requests between themselves. However, in the task-per-request model, the FPI server's interface to the family implementation is completely synchronous.

In one embodiment, one or more internal family request server tasks, and, optionally, an accept function, wait for messages on the family message port. An arriving message containing information describing an I/O request awakens one of the request server tasks, which calls a family function to service the request. All state information necessary to handle the request is maintained in local variables. The request server task is blocked until the I/O request completes, at which time it replies to the kernel message from the FPI library to indicate the result of the operation. After replying, the request server task waits for more messages from the FPI library.

As a consequence of the synchronous nature of the interface between the FPI server and the family implementation, code calling through this interface remains running as a blockable task. This calling code is either the request server task provided by the family to service the I/O (for asynchronous I/O requests) or the task of the requester of the I/O (for certain optimized synchronous requests).

The task-per-request model is advantageously employed for a family where an I/O request can require continuous attention from the processor and multiple I/O requests can be in progress simultaneously. A family that supports dumb, high bandwidth devices is a good candidate for this model. In one embodiment, the file manager family uses the task-per-request model. This programming model requires the family plug-in code to have tasking knowledge and to use kernel facilities to synchronize multiple threads of execution contending for family and system resources.

Unless there are multiple task switches within a family, the tasking overhead is identical within all of the activation models. The shortest task path from application to I/O is completely synchronous because all code runs on the caller's task thread.

Providing at least one level of asynchronous call between an application and an I/O request results in better latency results from the user perspective. Within the file system, a task switch at a file manager API level allows a user-visible application, such as the Finder™, to continue. The file manager creates an I/O tasks to handle the I/O request, and that task is used via synchronous calls by the block storage and SCSI families to complete their part in I/O transaction processing.

The Device Registry of the Present Invention

The device registry of the present invention comprises an operating system naming service that stores system information. In one embodiment, the device registry is responsible for driver replacement and overloading capability so that drivers may be updated, as well as for supporting dynamic driver loading and unloading.

In one embodiment, the device registry of the present invention is a tree-structured collection of entries, each of which can contain an arbitrary number of name-value pairs called properties. Family experts examine the device registry to locate devices or plug-ins available to the family. Low-level experts, discussed below, describe platform hardware by populating the device registry with device nodes for insertion of devices that will be available for use by applications.

In one embodiment, the device registry contains a device subtree pertinent to the I/O architecture of the present invention. The device tree describes the configuration and connectivity of the hardware in the system. Each entry in the device tree has properties that describe the hardware represented by the entry and that contain a reference to the driver in control of the device.

Multiple low-level experts are used, where each such expert is aware of the connection scheme of physical devices to the system and installs and removes that information in the device tree portion of the device registry. For example a low-level expert, referred to herein as a bus expert or a motherboard expert, has specific knowledge of a piece of hardware such as a bus or a motherboard. Also, a SCSI bus expert scans a SCSI bus for devices, and installs an entry into the device tree for each device that it finds. The SCSI bus expert knows nothing about a particular device for which it installs an entry. As part of the installation, a driver gets associated with the entry by the SCSI bus expert. The driver knows the capabilities of the device and specifies that the device belongs to a given family. This information is provided as part of the driver or plug-in descriptive structure required of all plug-ins as part of their PPI implementation.

Low-level experts and family experts use a device registry notification mechanism to recognize changes in the system configuration and to take family-specific action in response to those changes.

An example of how family experts, low-level experts, and the device registry service operate together to stay aware of dynamic changes in system configuration follows: Suppose a motherboard expert notices that a new bus, a new network interface and new video device have appeared within the system. The motherboard expert adds a bus node, a network node, and a video node to the device tree portion of the device registry. The device registry service notifies all software that registered to receive notifications of these events.

Once notified that changes have occurred in the device registry, the networking and video family experts scan the device registry and notice the new entry belonging to their family type. Each of the experts adds an entry in the family subtree portion of the device registry.

The SCSI bus expert notices an additional bus, and probes for SCSI devices. It adds a node to the device registry for each SCSI device that it finds. New SCSI devices in the device registry result in perusal of the device registry by the block storage family expert. The block storage expert notices the new SCSI devices and loads the appropriate drivers, and creates the appropriate device registry entries, to make these volumes available to the file manager. The file manager receives notification of changes to the block storage family portion of the device registry, and notifies the Finder™ that volumes are available. These volumes then appear on the user's desktop.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a method and apparatus for handling I/O requests in a computer system has been described.

We claim:

1. A computer system comprising:
   a bus;
   at least one memory coupled to the bus for storing data and programming instructions that include applications and an operating system; and
   a processing unit coupled to the bus and running the operating system and applications by executing programming instructions, wherein an application has a first plurality of tailored distinct programming interfaces available to access a plurality of separate sets of computer system services provided through the operating system of the computer system via service requests.

2. The computer system defined in claim 3 wherein each of the first plurality of tailored distinct programming interfaces are tailored to a type of I/O service provided by each set of I/O services.

3. A computer system comprising:

a bus;

at least one memory coupled to the bus for storing data and programming instructions that include applications and an operating system, wherein the operating system comprises a plurality of servers, and each of the first plurality of programming interfaces transfer service requests to one of the plurality of servers, wherein each of the plurality of servers responds to service requests from clients of the separate sets of I/O services; and a processing unit coupled to the bus and running the operating system and applications by executing programing instructions, wherein an application has a first plurality of tailored distinct programming interfaces available to access a plurality of separate sets of I/O services provided through the operating system via service requests.

4. The computer system defined in claim 3 wherein service requests are transferred as messages in a messaging system.

5. The computer system defined in claim 4 wherein each of the plurality of servers supports a message port.

6. The computer system defined in claim 3 wherein at least one of the plurality of servers is responsive to service requests from applications and from at least one other set of I/O services.

7. The computer system defined in claim 3 wherein the operating system further comprises a plurality of activation models, wherein each of the plurality of activation models is associated with one of the plurality of servers to provide a runtime environment for the set of I/O services to which access is provided by said one of the plurality of servers.

8. The computer system defined in claim 7 wherein at least one instance of a service is called by one of the plurality of servers for execution in an environment set forth by one of the plurality of activation models.

9. A computer system comprising:

a bus;

at least one memory coupled to the bus for storing data and programming instructions that comprise applications and an operating system;

a processing unit coupled to the bus and running the operating system and applications by executing programming instructions, wherein the operating system provides computer system services through a tailored distinct one of a plurality of program structures, each tailored distinct program structure comprising:

a first programming interface for receiving service requests for a set of computer system I/O services of a first type, a first server coupled to receive service requests and to dispatch service requests to the computer system I/O services, an activation model to define an operating environment in which a service request is to be serviced by the set of computer system I/O services, and at least one specific instance of the set of computer system I/O services that operate within the activation model.

10. The computer system defined in claim 9 wherein the first programming interface is responsive to request from applications and from other program structures.

11. The computer system defined in claim 9 wherein the first programming interface comprises at least one library for converting functions into messages.

12. The computer system defined in claim 9 wherein the first server receives a message corresponding a service request from the first programming interface, maps the message into a function called by the client, and then calls the function.

13. The computer system defined in claim 9 wherein the message comprises a kernel message.

14. A computer system comprising:

a bus;

at least one memory coupled to the bus for storing data and programming instructions that comprise applications and an operating system;

a processing unit coupled to the bus and running the operating system and applications by executing programming instructions, wherein the operation system provides input/output (I/O) services through a tailored distinct one of plurality of program structures, each tailored distinct program structure comprising:

a first programming interface for receiving service requests for a set of I/O services of a first type, a first server coupled to receive service requests and to dispatch service requests to the I/O services, an activation model to define operating environment in which a service request is to be serviced by the set of I/O services, and at least one specific instance of the set of I/0 services that operate within the activation model, wherein one of the said at least one specific instances comprises a service that accesses another program structure, and further wherein said one of said at least one specific instances communicates to said another program structure of a second type using a message created using a library sent to the server of said another program structure.

15. The computer system defined in claim 9 wherein two or more I/O services share code or data.

16. The computer system defined in claim 15 wherein said two or more I/O services are different types.

17. The computer system defined in claim 9 wherein the program structure further comprises a storage mechanism to maintain identification of available services to which access is provided via the first server.

18. A computer implemented method of accessing I/O services of a first type, said computer implemented method comprising the steps of:

generating a service request for a first type of I/O services;

a tailored distinct family server, operating in an operating system environment and dedicated to providing access to service requests for the first type of I/O service, receiving and responding to the service request based on an activation model specific to the first type of I/O services; and a processor running an instance of the first type of I/O services that is interfaces to the file server to satisfy the service request.

19. The method defined in claim 18 wherein the service request is generated by an application.

20. The method defined in claim 18 wherein the service request is generated by an instance of an I/O service running in the operating system environment.

* * * * *

UNITED STATES PATENT AND TRADEMARK OFFICE
CERTIFICATE OF CORRECTION

PATENT NO. : 5,915,131
DATED : June 22, 1999
INVENTOR(S) : Knight, et al.

It is certified that error appears in the above-identified patent and that said Letters Patent is hereby corrected as shown below:

In column 15 at line 14 delete "the" and insert -- a --
In column 15 at line 54 delete ":" and insert -- ; --
In column 16 at line 20 delete "operation" and
insert -- operating --
In column 16 at line 58 delete "interfaces" and
insert -- interfaced --

Signed and Sealed this

Eighteenth Day of January, 2000

Attest:

Attesting Officer

Q. TODD DICKINSON

Commissioner of Patents and Trademarks

(12) EX PARTE REEXAMINATION CERTIFICATE (9583rd)
United States Patent
Knight et al.

(10) Number: US 5,915,131 C1
(45) Certificate Issued: Apr. 1, 2013

(54) METHOD AND APPARATUS FOR HANDLING I/O REQUESTS UTILIZING SEPARATE PROGRAMMING INTERFACES TO ACCESS SEPARATE I/O SERVICES

(75) Inventors: Holly N. Knight, La Honda, CA (US); Carl D. Sutton, Palo Alto, CA (US); Wayne N. Meretsky, Los Altos, CA (US); Alan B. Mimms, San Jose, CA (US)

(73) Assignee: Apple Inc., Cupertino, CA (US)

Reexamination Request:
No. 90/011,311, Nov. 1, 2010

Reexamination Certificate for:
Patent No.: 5,915,131
Issued: Jun. 22, 1999
Appl. No.: 08/435,677
Filed: May 5, 1995

Certificate of Correction issued Jan. 18, 2000.

(51) Int. Cl.
*G06F 13/10* (2006.01)
(52) U.S. Cl.
USPC ............... 710/72; 707/999.104; 707/999.107; 719/328
(58) Field of Classification Search ........................ None
See application file for complete search history.

(56) References Cited

To view the complete listing of prior art documents cited during the proceeding for Reexamination Control Number 90/011,311, please refer to the USPTO's public Patent Application Information Retrieval (PAIR) system under the Display References tab.

*Primary Examiner* — Woo H Choi

(57) ABSTRACT

A computer system handling multiple applications wherein groups of I/O services are accessible through separate application programming interfaces. Each application has multiple application programming interfaces by which to access different families of I/O services, such as I/O devices.

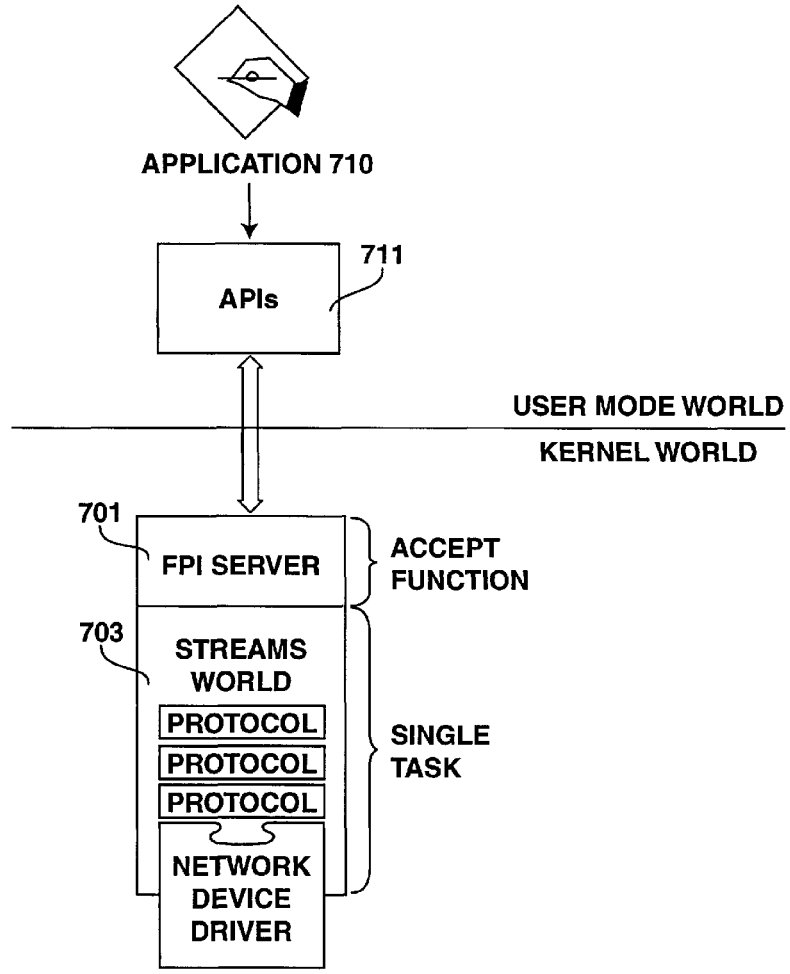

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-20 is confirmed.

Claims 1-6 are cancelled.

* * * * *